United States Patent [19]

Damkjaer

[11] Patent Number: 5,027,944
[45] Date of Patent: Jul. 2, 1991

[54] CONVEYOR CHAIN LINK

[75] Inventor: Poul E. Damkjaer, Vejle, Denmark

[73] Assignee: Masinfabrikken Baeltix A/S, Vejle, Denmark

[21] Appl. No.: 443,501

[22] Filed: Dec. 1, 1989

[30] Foreign Application Priority Data

Dec. 6, 1988 [GB] United Kingdom ............... 8828465

[51] Int. Cl.⁵ ............................................. B65G 17/06
[52] U.S. Cl. ................................................ 198/852
[58] Field of Search ............... 198/831, 822, 850–853, 198/840

[56] References Cited

U.S. PATENT DOCUMENTS

| | | | |
|---|---|---|---|
| 2,753,983 | 7/1956 | Bloomer | 198/822 |
| 3,513,965 | 5/1970 | Miller | 198/853 |
| 3,627,109 | 12/1971 | Cabak | 198/840 |
| 3,777,877 | 12/1973 | Piper | 198/852 |
| 3,807,548 | 4/1974 | Bergeron | 198/850 |
| 4,436,200 | 3/1984 | Hodlewsky et al. | 198/851 |
| 4,754,872 | 7/1988 | Damkjaer | 198/850 |

FOREIGN PATENT DOCUMENTS

2615598  10/1976  Fed. Rep. of Germany ...... 198/852

Primary Examiner—Joseph E. Valenza
Attorney, Agent, or Firm—Antonelli, Terry, Stout & Kraus

[57] ABSTRACT

A conveyor chain link which includes a lower part and a top plate which are all integrally molded as a plastic unit. The top plate includes a part extending in a direction of travel, with the part being offset a distance of the top plate and the chain link being mirror symmetrically constructed about a vertical plane in a direction of travel of the conveyor chain link.

2 Claims, 2 Drawing Sheets

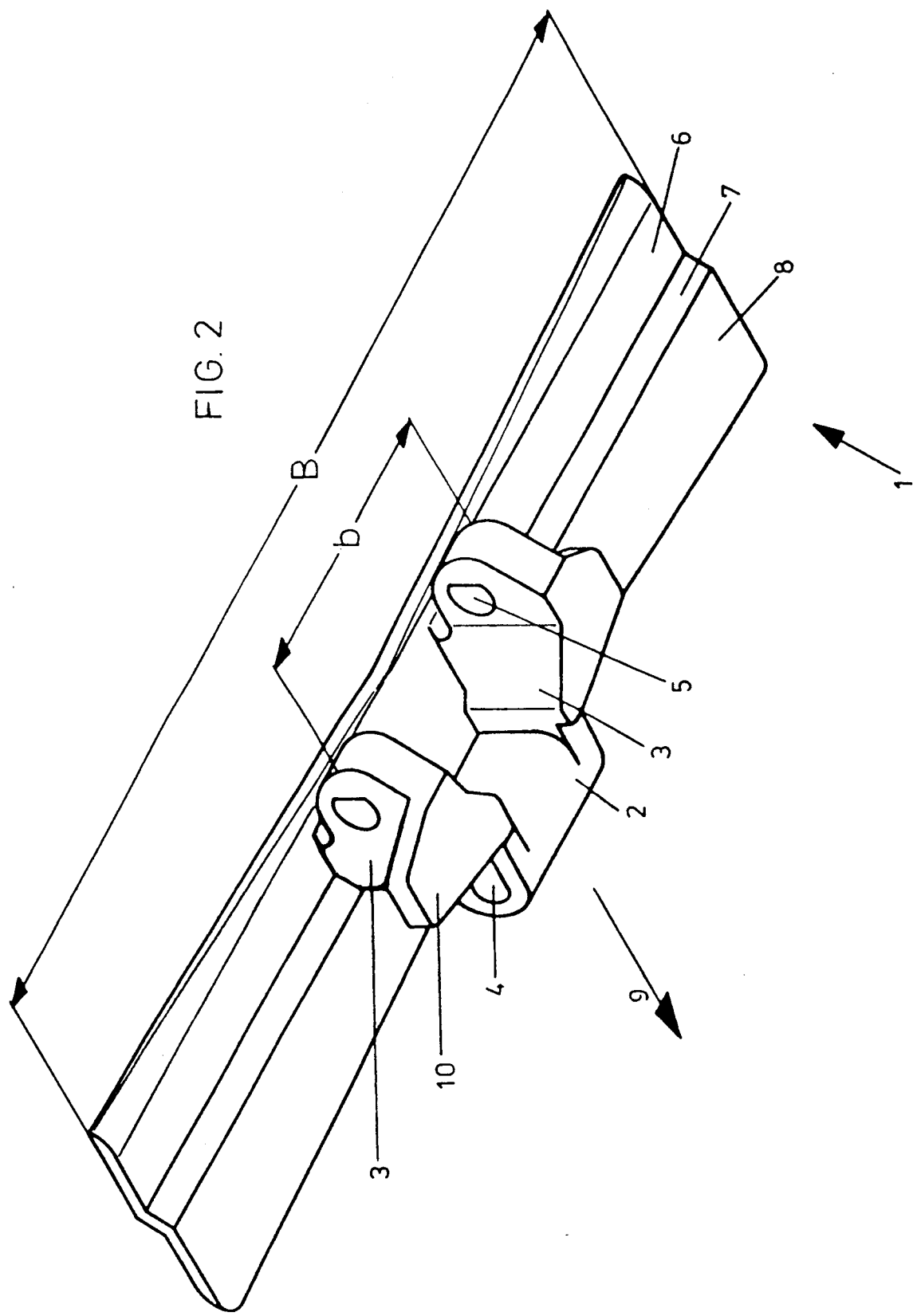

CONVEYOR CHAIN LINK

BACKGROUND OF THE INVENTION

The invention relates to a conveyor chain link and, more particularly, to a conveyor chain link having a lower part with a pulling and linking part and side members integrally formed therewith having transverse bores for accommodating chain pins, with a top plate arranged transversely to the direction of travel and being wider than the lower part of the chain link.

There are known a number of different forms of conveyor chain links adapted for building up conveyor link tracks where the chain links are built up by a lower part and a load-bearing part in the form of some kind of top plate. Such a conveyor is for example known from Canadian Patent No. 904,780 where each chain link is hinged together of base parts consisting of a top plate and a foot. By conveyor chain tracks built up by such chain links there is a risk that one or more top plates fall off when heavy objects accumulate on the chain or if objects fall down on the chain.

SUMMARY OF THE INVENTION

It is the object of the invention to provide a conveyor chain link by which it is possible to build up a highly flexible and very strong conveyor chain without any risk of losing one or more top plates even by hard impacts or stresses.

In accordance with advantageous features of the present invention, in a conveyor chain link of the aforementioned type, the top plate and the entire lower part are integrally molded as a unit. By such a chain link it is solely the strength of the material which is decisive of whether the top plate may be separated from the lower part and bearing the commercially available materials in mind, it is possible to produce chain links of suitable dimensions and obtain any desired strength thereby excluding separation.

In accordance with further advantageous features of the present invention, the top plate of the conveyor chain link includes a part extending in a direction of travel, with the part being offset relative to the top plate, and with the offset at least corresponding to a thickness of the top plate.

By virtue of the last noted features of the present invention, a conveyor chain built up by chain links becomes highly flexible relative to movability and running in curves without producing openings in the surface of the conveyor track. The advantage of overlapping is moreover that foreign bodies and dirt are prevented from either sticking between the links or falling down on the return chain below the chain track.

In order to enable the possibility of constructing conveyor chain tracks running equally well in right-hand as well as left-hand curves in accordance with further features of the present invention, the top plate and the extended part are substantially planar and arranged in parallel planes, with the chain link being constructed mirror symmetrical about a vertical plane in the direction of travel.

In order to produce a strong chain link of a great width which may run in curves of not too big a radius without producing openings in the surface of the conveyor track, which is attractive for many applications according to the present invention, a total width of the top plate is at least three times a width of the lower part measured as a length of the chain pin.

Advantageously, according to the present invention, the top plate may be gently arrow-shaped in a direction of travel with front edges as well as rear edges mutually forming an angle of 160°–175° with respect to each other. Furthermore, the offset extended part may also be gently arrow-shaped toward a direction of travel with the front edges thereof forming an angle with each other in a range of 160°–175°.

Conveyor chains of the aforementioned type are particularly applicable for many conveyance purposes and permit running in small radius curves without producing openings in the surface in that complete overlapping from chain link to chain link is ensured.

To facilitate manufacturing of the chain link constructed in accordance with the present invention, advantageously the chain link is molded in plastic. The molding of the chain link in plastic produces many technical advantages relative to manufacture since the chain link may be injection moulded and there is obtained a very strong chain link which not only has great strength in the direction of travel but where the top plate may not be removed from the chain link itself. With regard to noise it is also highly advantageous to design the chain links of plastic and with the lower part adapted for direct engagement with the drive chain wheel. Common roller chains make a lot of noise and use thereof is therefore avoided in processing and production industries with staff working close to the conveyors.

DESCRIPTION OF THE DRAWINGS

The invention will be further explained in the following with reference to the drawing showing a preferred embodiment of the invention wherein:

FIG. 2 is a bottom view of the same chain link.

DETAILED DESCRIPTION

Figure 1:
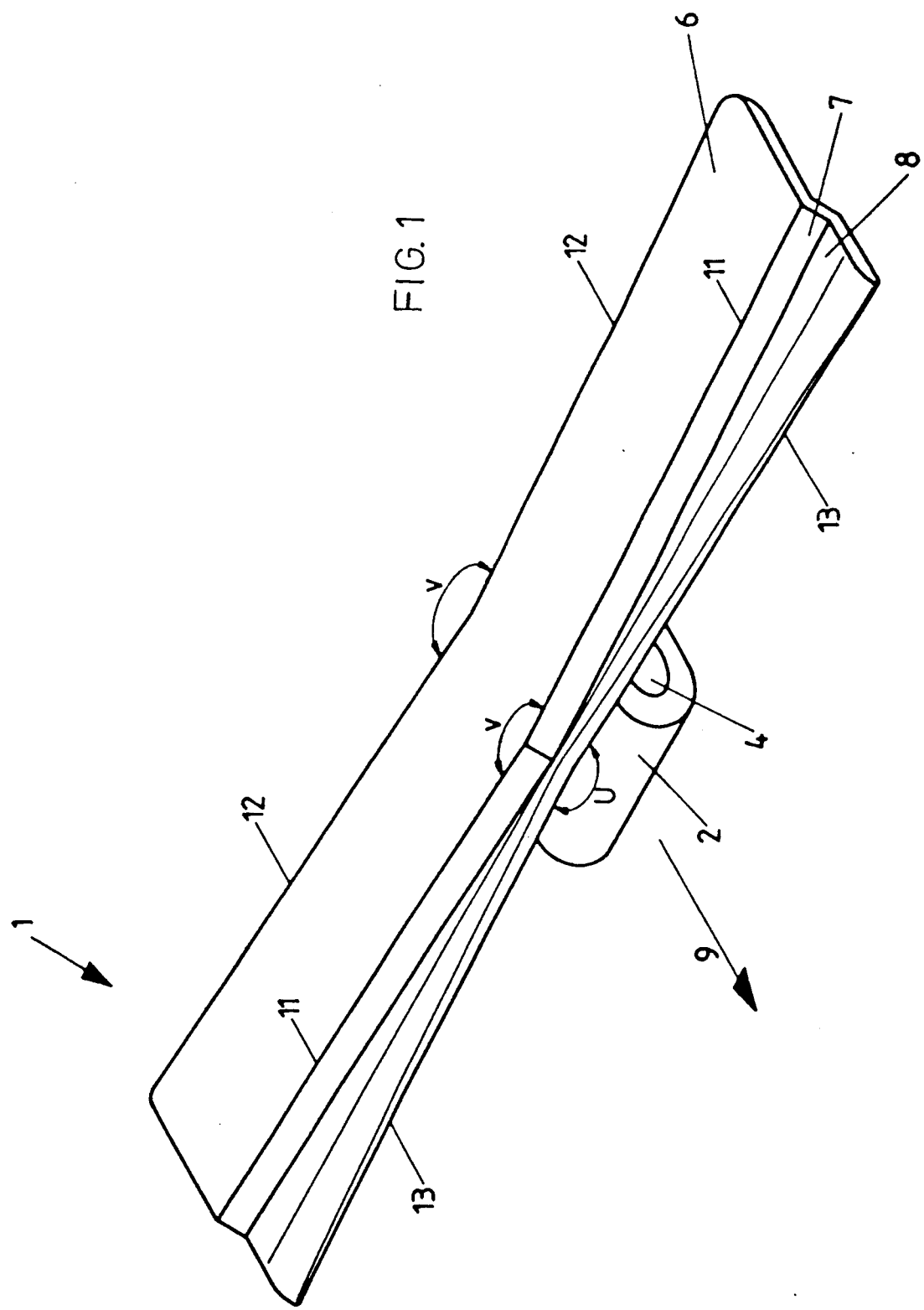
FIG. 1 is an inclined top view of a chain link according to the invention.

Referring now to the drawings wherein like reference numerals are used in both views to designate like parts and, more particularly, to FIG. 2, according to this figure an integrally moulded plastic chain link generally designated by the reference numeral 1 according to the invention has a lower part comprising a linking and pulling part 2 and two side members 3 formed integrally therewith. The linking and pulling part 2 is provided with a crossbore 4 which is generally elongate in the direction of travel but narrowing towards the center of the chain link 1 so that a chain pin (not shown) may tip in the plane of the chain track. In each of the side members 3 there is provided a crossbore 5, with the crossbores being aligned and being adapted to retain a chain pin which in the usual manner passes through the hole 4 of the next chain link. The side members 3 may be provided with lower projections 10 so that the chain links 1 cannot be lifted off the slide rails of the pulling track on a rising or falling track.

The linking and pulling part 2 is on its outside designed in such a manner that it may engage driving or idling chain wheels.

As shown most clearly in FIG. 1 integrally with the lower part there is designed a top plate 6 which furthermore comprises an offsetting part 7 and an offset, extended top plate part 8 at either side of the lower part. The plate part 6 and the plate part 8 are substantially planar but arranged separate different planes parallel to each other. The offset 7 is usually of the same size as the thickness of the top plate 6 so that the extended top plate 8, which at its forwardly facing edge may be rounded or inclined, may slide under the top plate of the chain link travelling in front thereof.

The top plate 6 has at either side a front edge 11 and a rear edge 12, viewed in the direction of travel 9, with the edges 11, 12 in the illustrated embodiment forming an angle of 160°-175° with each other so that the top plate 6 becomes gently arrow-shaped in the direction of travel 9. The front edges 13 of the extended top plate 7 are gently arrow-shaped towards the direction of travel 9, also at an angle of 160°-175° in the illustrated embodiment.

As shown most clearly in FIG. 2, the top plate 6 of the chain link has a width B which is substantially greater than the width b of the lower part, and for example, may be three or more times wider.

As readily apparent to a person skilled in the art even if the chain link according to the invention is preferably designed with the angles V and U of 160°-175°, it is possible to design chain links of other angles without departing from the basic idea of the invention.

I claim:

1. Conveyor chain link comprising a lower part, a pulling and linking part disposed on said lower part and including a cross bore for accommodating a chain pin, side members provided at respective opposite sides of the pulling and linking part and including transverse bore means for accommodating a further chain pin, a top plate arranged transversely to a direction of travel of the conveyor chain link and having a total width wider than a total width of the lower part, said top plate including a first substantially planar top surface, a second substantially planar top surface and a gradually sloping surface interconnecting said first and second top surfaces, said first and second top surfaces being disposed in different planes such that said second top surface is offset with respect to said first top surface by a distance at least corresponding to a thickness of said top plate, said second top surface extending outwardly from said first top surface in the direction of travel of the conveyor chain link, the chain link is mirror symmetrical about a vertical plane in the direction of travel of the chain link, the top plate, the lower part, the pulling and linking part and side members are integrally moulded so as to form a conveyor chain link unit, the total width of the top plate is at least three times the total width of the lower part as measured in a longitudinal direction of the chain pin, the first top surface includes a forward edge located in the direction of travel of the chain link, the forward edge includes first and second forward edge portions extending from respective sides of the top surface toward the center thereof so as to form an arrow shape extending in a direction of travel of the conveyor link, the rearward edge includes first and second rearward edge portions extending from the respective side edges of the first top surface toward the center thereof so as to form an arrow shape extending in the direction of travel of the conveyor link, said first and second forward edge portions and said first and second rearward edge portions mutually form an angle with each other in a range of 160°-175°, wherein the second top surface includes a forward edge comprising a first forward edge portion and a second forward edge portion extending from respective side edges of said second top surface so as to form an arrow-shape pointing in a direction opposite the direction of travel of the conveyor chain link, and wherein the first forward edge portion and the second forward edge portion of the second top surface mutually form an angle with each other in a range of 160°-175°.

2. Conveyor chain link according to claim 1, wherein the conveyor chain link unit is moulded in plastic.

* * * * *